(12) United States Patent
Mykytiuk

(10) Patent No.: US 12,091,344 B2
(45) Date of Patent: Sep. 17, 2024

(54) OF SOLID HOUSEHOLD WASTES LANDFILLS AND INDUSTRIAL SEWAGES

(71) Applicant: Oleksandr Yuriiovych Mykytiuk, Kyiv (UA)

(72) Inventor: Oleksandr Yuriiovych Mykytiuk, Kyiv (UA)

(73) Assignee: Unique Equipment Solutions LLC, Littleton, MA (US)

( * ) Notice: Subject to any disclaimer, the term of this patent is extended or adjusted under 35 U.S.C. 154(b) by 492 days.

(21) Appl. No.: 17/425,110

(22) PCT Filed: Oct. 25, 2019

(86) PCT No.: PCT/UA2019/000129
§ 371 (c)(1),
(2) Date: Jul. 22, 2021

(87) PCT Pub. No.: WO2020/159465
PCT Pub. Date: Aug. 6, 2020

(65) Prior Publication Data
US 2022/0098072 A1 Mar. 31, 2022

(30) Foreign Application Priority Data
Jan. 28, 2019 (UA) .............. A 2019 00853

(51) Int. Cl.
| C02F 9/00 | (2023.01) |
| C02F 1/00 | (2023.01) |
| C02F 1/36 | (2023.01) |
| C02F 1/44 | (2023.01) |
| C02F 1/469 | (2023.01) |
| C02F 1/66 | (2023.01) |
| C02F 1/68 | (2023.01) |
| C02F 1/72 | (2023.01) |
| C02F 101/10 | (2006.01) |
| C02F 101/30 | (2006.01) |
| C02F 103/06 | (2006.01) |

(52) U.S. Cl.
CPC ............ C02F 9/00 (2013.01); *C02F 1/001* (2013.01); *C02F 1/36* (2013.01); *C02F 1/441* (2013.01); *C02F 1/4693* (2013.01); *C02F 1/66* (2013.01); *C02F 1/68* (2013.01); *C02F 1/722* (2013.01); *C02F 2101/10* (2013.01); *C02F 2101/30* (2013.01); *C02F 2103/06* (2013.01); *C02F 2301/08* (2013.01); *C02F 2303/16* (2013.01)

(58) Field of Classification Search
CPC .... C02F 1/001; C02F 1/04; C02F 1/36; C02F 1/441; C02F 1/444; C02F 1/46109; C02F 1/4693; C02F 1/52; C02F 1/5245; C02F 1/66; C02F 1/68; C02F 1/722; C02F 2001/007; C02F 2001/46133; C02F 2101/10; C02F 2101/20; C02F 2101/30; C02F 2103/06; C02F 2301/08; C02F 2303/16; C02F 9/00
See application file for complete search history.

(56) References Cited

FOREIGN PATENT DOCUMENTS

| CN | 101698550 A | 4/2010 |
| CN | 202193699 U | 4/2012 |
| CN | 103183424 A | 7/2013 |
| RU | 2400437 C1 | 9/2010 |
| UA | 72677 C2 | 3/2005 |
| UA | 23418 | 5/2007 |
| UA | 55938 U | 12/2010 |

OTHER PUBLICATIONS

Kashkovsky V.I et al., "Complex Processing Technology of Ground Filtrational Waters of Solid Municipal Wastes", Energy Technologies and Resource Saving, 2010, No. 5, pp. 61-67.

*Primary Examiner* — Dirk R Bass
(74) *Attorney, Agent, or Firm* — Loginov & Associates, PLLC; William A. Loginov

(57) ABSTRACT

The invention relates to environment protection, in particular, to a technology for neutralization of filtrates, which are formed in a layer of solid domestic and industrial wastes landfills (dumps) under the action of atmospheric precipitates, and more particularly, to purification, collection and destroy of the filtrates. The invention mitigates toxicity of said filtrates, which in the course of percolating through a wastes layer, excrete toxic substance(s) therefrom and/or are saturated by their decomposition products, which are subsequently be released to cause contamination of subsoil water and/or the environmental soil.

11 Claims, No Drawings

OF SOLID HOUSEHOLD WASTES LANDFILLS AND INDUSTRIAL SEWAGES

The invention relates to environment protection, in particular, to a technology for neutralization of filtrates, which are formed in a layer of solid household and industrial wastes landfills (dumps) under the action of atmospheric precipitates, more particularly, to purification, collection and destroy of the filtrates.

A need in such technology is caused by toxicity of said filtrates, which, in the course of percolating through the wastes layer, extract toxic substance therefrom and/or are saturated by their decomposition products and, thus, are able to contaminate the subsoil water and the environmental soil.

A method of neutralization of filtrate on landfill of solid household and industrial waste is known, the method comprising construction, in the subsoil, of a multilayer antifiltration screen, which includes a dense clay layer and a drainage interlayer located above it, connected to a system for post-purification of sewages outside the landfill, preliminary purification of the filtrate in the area located above said clay layer, collection and removal of mechanically purified filtrate for the final purification, characterized in that during construction of said screen above the drainage interlayer there is placed a layer of dense filtering material, which retains the filtrate in the mass of accumulated wastes for their anaerobic decomposition, and the filtrate saturated by the products of anaerobic decomposition, which percolates through said layer of dense filtering material, is additionally maintained in the drainage interlayer for deep decomposition of toxic substances, and only then it is removed from the territory of landfill for the final purification (Patent of Ukraine No. 23418 dated 10.05.2007).

A drawback of the known method lies in that said screens does not provide a reliable protection of the environment from the toxic substances due to partial washout and/or overflow of the layer of solid household and industrial wastes by the filtrate and its flowing out outside the landfill over the clay layer A method that is closest to the claimed invention is a method for complex purification of filtrates of dumps of solid household wastes, the method is based on that in order to provide deep purification of the filtrate, a solid catalyst is added thereto (iron sulfates, nitrates or chlorides, and, preferably, ferrous iron sulfate) in the amount of from 0.05 to 1.00% based on volume of the outgoing filtrate and an oxidizer—an ozone, hydrogen peroxide and, preferably, atmospheric oxygen, which are supplied either during mixing in the amount of from 0.5 to 3.0% based on the volume of the outgoing filtrate (hydrogen peroxide) or bubbled through a liquid layer (ozone or air) for 1-6 hours, and after completion of the oxidation process one of coagulants is added to the mixture: aluminum sulfate, polyaluminum chloride, iron salts (sulfate, nitrate or chloride) or a mixture thereof, and, preferably, an inorganic coagulant-flocculant of a "Syzol" type in the amount of from 0.5 to 4.0% based on total amount of the formed mixture, and after settling of a solid phase the clarified water is fed (dependent on a chemical composition of the outgoing filtrate and the given final result—discharge into the environment, in-house needs, technical distilled water) onto a membrane purification unit or to the basin with the higher aqueous vegetation, or successively to the membrane purification unit and basin with the higher aqueous vegetation, and then it is used for its intended purpose, and a sediment that is formed in a reactor unit is fed to a section for the preparation of an insulating material for needs of landfill (for pouring layers of the waste) or it is used in the technology of non-return fastening of concentrated residue, thereby forming a solid, almost water-insoluble material (Patent of Ukraine No. 55938 dated 27.12.2010).

A drawback of this method lies in impossibility of elimination of toxic wastes in the process of purification of the filtrate of solid household waste landfills or industrial sewages, which are largely contaminated with organic compounds and other substances, and, as a consequence, contamination of the natural environment.

A task underlying the invention lies in a non-waste purification of the filtrate of solid household waste landfills or industrial sewages, which are largely contaminated with organic compounds and other substances.

The stated task is solved by means of the developed method that lies in the following.

Reduction of pH values of the filtrate by adding a concentrated sulfuric acid solution;

settling the filtrate;

separating a formed residue from the water solution by any known means;

increasing the pH values of the solution by means of adding a calcium lime;

settling a suspension with a periodical ultrasound treatment of the suspension;

separating the residue from the solution by any known means;

saturating the $CO_2$ solution by any known means using a pure $CO_2$ or a mixture thereof with other gases;

in case of reduction of the pH level values of the suspension at the end of the settlement, re-increasing the pH values of the suspension by adding the calcium lime to the suspension;

re-settling the suspension in case of adding the calcium lime with a periodical ultrasound exposure on the suspension;

separating the residue from the solution by any known means;

saturating the $CO_2$ solution by any known means using a pure $CO_2$ or a mixture thereof with other gases;

separating the residue from the solution by any known means;

reducing the pH values of the solution by means of electrolysis of the solution in an equipment without membrane electrolysis with the solution flow between electrons using soluble electrodes made of steel, copper and/or aluminum;

separating the residue from the solution by any known means;

oxidizing residues of organic compounds in the solution and calcium ions by adding an aqueous hydrogen peroxide solution to the solution with a periodical ultrasound treatment of the suspension;

settling the solution;

filtrating the solution through a filter with a separation of solid particles from the solution;

removing ions from the solution by filtering the solution on a reverse osmosis filter or on an electrodialisys equipment;

concentrating the filtrate of the reverse osmosis membrane on the electrodialisys equipment;

regenerating the lime saturated with organic compounds by heating thereof, e.g., by microwave energy;

using the organic compounds separated at the first stage without heavy metals as an organic manure;

evaporating the formed liquid wastes using passive methods, e.g., on a biological plate with high aquatic vegetation during growth season, and accumulating during winter period, or using the filtrate of the reverse osmosis membrane and/or concentrate in the electrodialisys equipment as a make-up water for manufacturing concrete products, e.g., pavement slabs.

The method is carried out as follows.

The method for non-waste purification of a filtrate of solid household wastes landfills and industrial sewages is characterized in successive changing of the pH level of the solution (filtrate), performing separation of the residue from the aqueous solution, performing filtration of the solution followed by use of purification products as raw materials.

The pH of the filtrate is reduced down to the values of from 2 to 3 by adding 30% or more concentrated sulfuric acid solution. The filtrate is settled for 15-90 minutes. The formed residue is separated from the water solution by any known means. The pH of the solution is increased up to the values of from 8 to 9 by adding the calcium lime and treating the suspension with ultrasound having any frequency. The suspension is settled for 15-90 minutes with simultaneous exposure of the suspension by the ultrasound having any frequency. The residue is separated from the solution by any known means. The $CO_2$ solution is saturated by any known means using a pure $CO_2$ or a mixture thereof with other gases. The pH of the solution is increased up to the values of from 10 to 12 by adding the calcium lime and treating the suspension with ultrasound having any frequency. The suspension is settled for 15-90 minutes with simultaneous exposure to the ultrasound. In case of reduction of the pH level of the suspension at the end of the settlement down to the values lower than 10.5, the pH of the suspension is re-increased up to the pH values of from 11 to 12 by adding the calcium lime to the suspension. The suspension is re-settled for 15-90 minutes in case of addition of the calcium lime. The residue is separated from the solution by any known means. The $CO_2$ solution is saturated by any known means using a pure $CO_2$ or a mixture thereof with other gases. The residue is separated from the solution by any known means. The pH of the solution is reduced down to the values of from 8 to 9 by means of electrolysis of the solution in an equipment without membrane electrolysis with the solution flow between electrons at a rate of up to 20 meters per minute using soluble electrodes made of steel, copper and/or aluminum. The residue is separated from the solution by any known means. The remainder of the organic compounds in the solution and calcium ions are oxidized by adding 30% or 50% aqueous hydrogen peroxide solution to the solution in the amount of 0.5-2 ml per liter with simultaneous exposure to the ultrasound having any frequency. The solution is settled for 15-90 minutes. The solution is filtered through a filter with a separation of solid particles having a size over 0.1 micron from the solution. The solution is filtered with a separation of solid particles having a size over 0.01 micron from the solution. Ions are removed from the solution by filtering the solution on a reverse osmosis filter or on an electrodialisys equipment. The filtrate of the reverse osmosis membrane is concentrated on the electrodialisys equipment. The lime saturated with organic compounds is regenerated by heating thereof, e.g., by microwave energy, up to the temperature above 200° C.;

The formed liquid wastes are evaporated using a transpiration process, e.g., on a biological plate with high aquatic vegetation in the amount of 3-4 liters of the filtrate per 1 m$^2$ per one day during growth season, and accumulated during winter period.

Non-wastefulness of the purification is provided due to obtaining, as a result of the claimed process, of products in the form of organic compounds that are free of heavy metals, filtrate of the reverse osmosis membrane and/or concentrate of the electrodialysis equipment, used lime and further using these products as raw materials, which are further used in industry or another cycle.

The organic compounds that are free of heavy metals separated at the first stage are used as an organic manure.

The filtrate of the reverse osmosis membrane and/or concentrate of the electrodialysis equipment are/is used as a make-up water to manufacture concrete products, e.g., pavement slabs. Non-wastefulness of the purification is provided by regeneration of the used lime with its repeated multiple use for purification of the filtrate.

Confirmation of a possibility of using the method for achievement of the technical effect lies in:

removal of a part of organic substances without removal of ions of heavy metals from the filtrate or industrial sewages as a result of their coagulation during reduction of the pH of the solution down to the values of from 2 to 3 by adding the sulfuric acid solution in the amount that is necessary to reduce the pH level of the solution down to the required one followed by separation of the residue;

use of the separated organic substance, without heavy metals impurities, as a concentrate of organic manure;

removal of barium ions from the filtrate as a result of formation of an insoluble barium salt and sulfuric acid followed by separation of a solid residue;

removal and oxidation of a portion of the organic substances as a result of changing the pH level of the solution from pH 2-3 to pH 8-9 by adding the calcium lime in the amount that is necessary to obtain the required pH level of the solution followed by separation of the formed solid residue from the solution;

removal of a portion of the calcium ions from the solution through formation of $CaCO_3$ crystals in the solution during saturation of the solution with carbon dioxide or with a gas mixture that comprises $CO_2$, e.g., with air;

removal and further oxidation of the organic compounds, heavy metals in the solution as a result of increasing the pH level up to 11-12 by adding the calcium lime in the amount that is required to achieve and maintain the required pH level of the solution during settlement of the suspension, and further separation of the residue;

recovery of the used lime by its heating, e.g., with microwave energy, up to the temperature above 200° C. and its repeated use;

removal of the calcium from the solution by saturating the solution with $CO_2$ followed by separation of the formed insoluble $CaCO_3$ salt;

removal and/or oxidation of the remainder of the organic compounds in the solution by reducing the pH level of the solution down to the pH values of from 8 to 9 as a result of treatment of the solution in the equipment without membrane electrolysis with soluble electrods made of steel, copper or aluminum followed by separation of the solid residue;

oxidation of the remainder of the organic compounds and calcium ions in the solution by adding 30-50% of the aqueous hydrogen peroxide solution therein followed by removal of the solid residue in the filtration process;

removal of ions up to the required concentration from the solution by their separation on the reverse osmosis membrane and further concentration of the ions in the filtrate of the reverse osmosis membrane on the electrodialysis equipment for reduction of liquid wastes down to the level of 3-5% based on a derivative volume of the filtrate or industrial sewages; or:

removal of the ions from the solution up to the required concentration on the electrodialysis equipment;

evaporation of the filtrate of the reverse osmosis membrane and concentrate on the electrodialysis equipment, e.g., on a biological plate during growth season, or using the microwave energy; or:

use of the filtrate of the reverse osmosis membrane and/or concentrate of the electrodialysis equipment as a make-up water to manufacture concrete products, e.g., pavement slabs.

Selection of the purification stages.

In order to achieve the stated technical task, the following is required:

Removal, from the filtrate having an uncertain formulation, of the portion of organic compounds, which are present in the filtrate and which coagulate in acid medium (stages—reduction of the pH of the filtrate by adding the sulfuric acid, settling the filtrate, separating the residue).

Removal of barium simultaneously with the removal of the portion of organic compounds (stages—reduction of the pH of the filtrate by adding the sulfuric acid, settling the filtrate, separating the residue)

Removal, from the filtrate having an uncertain formulation, of the portion of organic compounds, which coagulate in alkaline medium (stages—successive increase of the pH of the filtrate by adding the calcium lime, settling, separating the residue)

Removal, from the filtrate having an uncertain formulation, of heavy metals by their transferring to slightly soluble salts in alkaline medium (stages—successive increase of the pH of the filtrate by adding the calcium lime, settling, separating the residue)

Removal of the dissolved calcium forms from the filtrate by transferring to the slightly soluble ones (stage—saturating with the dioxide carbon, settling, separating the residue)

Removal, from the filtrate, of the organic compounds and other substances, which remained at this step in the filtrate and reduction of the pH level from the alkaline one to the neutral one (stages—electrolysis on the equipment without membrane electrolysis, separating the residue).

Oxidation of stable organic compounds, which do not coagulate in acid and alkaline mediums and which have not been decomposed during electrolysis (stage of adding the hydrogen peroxide with the ultrasound treatment, settling, separating the residue).

Removal, from the water, of ions, which remained in the filtrate at this stage, reduction of the water salinity, reduction of the concentration of solid dissolved substances (stage of electrodialysis or reverse osmosis)

Disposal of liquid wastes after the stage of electrodialysis or reverse osmosis (variants—biological plate, use as a make-up water for concrete products).

Selection of the concentration of the hydrogen peroxide (30% and 50%) is caused by availability of saleable production on market with these concentrations.

Selection of the pH level is caused by the acidity and alkalinity level, at which the corresponding organic substances coagulate. Selection of the acidity level is not related to the removal of barium. Formation of slightly soluble barium salts occurs in a wide range of the pH values. Maximum level of the alkalinity of the solution is also caused by the alkalinity level, at which the majority of heavy metals forms the least soluble compounds, which allows to remove the heavy metals from the solution in an effective manner.

Example No. 1. To 6 liters of the filtrate having an uncertain quantitative and qualitative formulation of organic and mineral substances, which has BOD=4250 mg/l, COD=5720, conductivity—11580 μS/cm, pH=7.5, a 5% sulfuric acid aqueous solution is added to obtain the value of pH=3.0. The filtrate having pH=3.0 is settled for 30 minutes with periodical stirring. The formed residue is filtered out on a paper filter. To the obtained filtrate having pH=3.0 a calcium oxide is added in the amount that increases the pH level of the filtrate from 3.0 up to 8.0. The filtrate having pH=8.0 is settled for 30 minutes with periodical stirring. The residue is filtered out on a paper filter. To the filtrate having pH=8.0 a calcium oxide is added in the amount that allows increase of the alkalinity level of the filtrate up to pH=11.0. The filtrate having the alkalinity of pH=11.0 is settled for 15 minutes with periodical stirring. The residue that was formed during the settling time is removed on the paper filter. The filtrate having pH=11.0 is treated on a flow-through electrolysis apparatus (direct voltage, 8 volts, current density of A/dm2) with the solution supply rate of 20 m/min up until the filtrate reaches the level of pH=8.0. The formed residue is separated on a paper filter. The filtrate having pH=8.0 is blown off by air for 15 minutes. The formed residue is separated on a paper filter. 1 ml/l of 30% aqueous hydrogen peroxide solution is added to the filtrate. The filtrate is settled for 30 minutes with periodical ultrasound cavitation treatment of the filtrate in a flow-through mode. Filtration of the filtrate on the ultrafiltration filter with a ceramic cartridge. Treatment of the filtrate on the electrodialysis equipment in a flow-through mode until the current density reduces from the initial level of 3.5 Ampers to 1.0 Amper at 70 volts, the voltage is direct. After the electrodialysis apparatus the yield is 100% permeate having pH=7.5, water conductivity—145 μS/cm, concentration of solid dissolved substances—75 mg/l, COD—195 mg/l, BOD—125 mg/l.

Example No. 2. To 6 liters of the filtrate having an uncertain quantitative and qualitative formulation of organic and mineral substances, which has BOD=4250 mg/l, COD=5720, conductivity—11580 μS/cm, pH=7.5, a 5% sulfuric acid aqueous solution is added to obtain the value of pH=3.0. The filtrate having pH=3.0 is settled for 30 minutes with periodical stirring. The formed residue is filtered out on a paper filter. To the obtained filtrate having pH=3.0 a calcium oxide is added in the amount that increases the pH level of the filtrate from 3.0 up to 8.0. The filtrate having pH=8.0 is settled for 30 minutes with periodical stirring. The formed residue is filtered out on a paper filter. To the filtrate having pH=8.0 a calcium oxide is added in the amount that allows increase of the alkalinity level of the filtrate up to pH=11.0. The filtrate having the alkalinity of pH=11.0 is settled for 15 minutes with periodical stirring. The residue that was formed during the settling time is removed on the paper filter. The filtrate having pH=11.0 is treated on a flow-through electrolysis apparatus (direct voltage, 8 volts, current density of A/dm2) with the solution supply rate of 15 m/min up until the filtrate reaches the level of pH=9.0. The formed residue is separated on a paper filter. The filtrate having pH=9.0 is blown off by air for 15 minutes. The formed residue is separated on a paper filter. 1 ml/l of 30% aqueous hydrogen peroxide solution is added to the filtrate. The filtrate is settled for 30 minutes with periodical ultrasound cavitation treatment of the filtrate in a flow-through mode. Filtration of the filtrate on the ultrafiltration filter with a ceramic cartridge. Treatment of the filtrate on the reverse osmosis apparatus. The yield from the reverse osmosis apparatus is 75 vol. % of permeate having pH=8.5, conductivity—75 μS/cm, concentration of solid dissolved substances—45 mg/l, COD—90 mg/l, BOD—5 mg/l; and 25 vol. % of the concentrate having conductivity of 2150 μS/cm. The concentrate was evaporated through exposure to solar radiation on a thermally-conductive surface with an extended structure of black color.

The invention claimed is:

1. A method for non-waste purification of a filtrate of solid household wastes landfills and industrial sewages, comprising the steps of:
   changing a pH level of the filtrate in an aqueous solution;
   separating a residue from the aqueous solution;
   performing filtration of the aqueous solution, including adding, so as to reduce the pH level of the filtrate to 2 to 3, 30% or more concentrated sulfuric acid solution;
   settling the filtrate for 15-90 minutes, and separating a formed residue from the aqueous solution;
   adding, so that the pH of the aqueous solution is increased to 8 to 9 calcium lime, and treating a suspension thereof in the aqueous solution with ultrasound;
   settling the aqueous solution for 15-90 minutes with simultaneous exposure of the aqueous solution to ultrasound and separating a residue from the aqueous solution;
   saturating the aqueous solution using a pure CO2 or a mixture thereof with other gases;
   increasing the pH of the aqueous solution to 10 to 12 by adding the calcium lime and treating a suspension thereof in the aqueous solution with ultrasound;
   settling the aqueous solution for 15-90 minutes with simultaneous exposure to the ultrasound;
   reducing the pH of the aqueous solution to 8 to 9 by applying electrolysis to the aqueous solution;
   oxidizing a remainder of organic compounds and calcium ions of the calcium lime in the aqueous solution by adding 30% to 50% aqueous hydrogen peroxide solution to the aqueous solution with simultaneous exposure to ultrasound, settling the aqueous solution, and filtering the aqueous solution through a filter that separates solid particles having a size over 0.1 micron from the aqueous solution;
   removing ions from the aqueous solution by filtering the aqueous solution on a reverse osmosis filter or on electrodialysis equipment, with filtrate thereof being deposited on a reverse osmosis membrane or residue thereof being concentrated on the electrodialysis equipment, respectively.

2. The method of claim 1, wherein the step of settling the aqueous solution includes, reducing the pH level of the aqueous solution at the end of the settling to less than 10.5, then increasing the pH level of the aqueous solution to 11 to 12 by adding the calcium lime to form a suspension in the aqueous solution, then resettling the aqueous solution 5-90 minutes, and then separating residue from the aqueous solution.

3. The method of claim 1, wherein the step of applying electrolysis includes flowing, free of membrane electrolysis, the aqueous solution a rate of up to 20 meters per minute between soluble electrodes, and separating residue therefrom.

4. The method of claim 1 wherein the electrodes comprise at least one of steel, copper and aluminum.

5. The method of claim 1, wherein the step of oxidizing includes adding the 30% or to 50% aqueous hydrogen peroxide solution to the aqueous solution in an amount of 0.5-2.0 ml per liter.

6. The method of claim 5, further comprising, after adding the 30% or to 50% aqueous hydrogen peroxide solution to the aqueous solution, settling the aqueous solution for 15-90 minutes.

7. The method of claim 6, further comprising, after filtering the aqueous solution through a filter that separates solid particles having a size over 0.1 micron from the aqueous solution, then filtering the aqueous solution through a filter that separates solid particles having a size over 0.01 micron from the aqueous solution.

8. The method as set forth in claim 1, further comprising, after removing ions from the aqueous solution by filtering the aqueous solution on a reverse osmosis filter or on electrodialysis equipment, regenerating lime saturated with organic compounds by heating thereof at a temperature above 200° C. so that formed liquid wastes are evaporated.

9. The method as set forth in claim 8, wherein the formed liquid wastes are evaporated using a transpiration process and are accumulated during a winter period.

10. The method of claim 8, further comprising using the organic compounds in an organic manure fertilizer.

11. The method of claim 1, further comprising, using the filtrate deposited on the reverse osmosis membrane or the residue concentrated of the electrodialysis in make-up water to manufacture concrete products.

\* \* \* \* \*